Dec. 15, 1959  F. G. REUTER ET AL  2,917,348
CUSHION FOR TRACTOR TRACKS AND THE LIKE
Filed Feb. 21, 1958
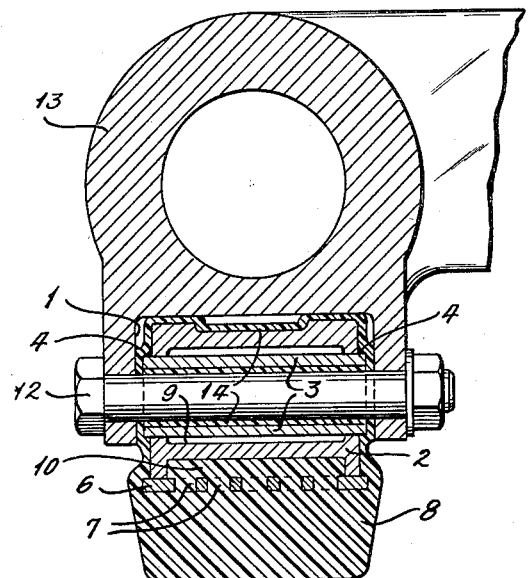
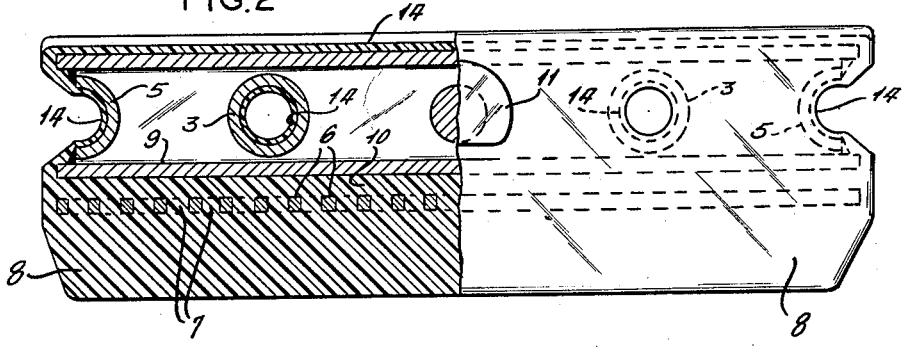
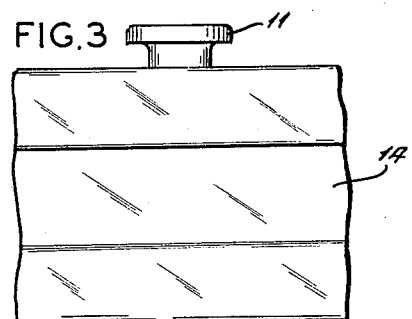

United States Patent Office 2,917,348
Patented Dec. 15, 1959

2,917,348

CUSHION FOR TRACTOR TRACKS AND THE LIKE

Franz G. Reuter and Jürgen Ulderup, Lemforde, Hannover, and Ernst Kniepkamp, Heilbronn (Neckar), Germany, assignors, by mesne assignments, to Mobay Chemical Company, Pittsburgh, Pa., a corporation of Delaware Application February 21, 1958, Serial No. 716,726

Claims priority, application Germany February 23, 1957

5 Claims. (Cl. 305—38)

This invention relates generally to an improved cushion for a tractor track or the like and, more particularly, to a cushion having a novel holder.

It has been proposed heretofore to provide tractor or similar endless tracks with a rubber cushion or a cushion of a similar flexible material. In order to secure the cushion to the track, it is necessary to provide a holder which has been formed by a die-pressing operation from sheet metal. The holder is bolted to each individual link of the track. Such cushions do not have a very long service life, particularly when used at high speed or on rough roads. Moreover, the heretofore available holders for the cushions are relatively weak and deform under the load of the tractor requiring frequent replacement of the cushion and holder.

It is, therefore, an object of this invention to provide a novel and improved cushion and holder combination for a tractor track or similar endless track or belt. Another object of the invention is to provide an endless track having an improved cushion which is adapted to withstand abrasion and heavy loads. A still further object of the invention is to provide an improved method of fabricating a cushion for an endless track or the like.

Other objects will become apparent from the following description with reference to the accompanying drawing in which Figure 1 is a cross-section of a link of an endless track with an embodiment of the holder and cushion provided with this invention attached thereto;

Figure 2 is a side view partially in section of an embodiment of the invention; and Figure 3 is a top view of the embodiment of Figure 2.

The foregoing objects and others are accomplished in accordance with this invention, generally speaking, by providing a track cushion for tractors and the like, having a holder fabricated from sheet metal and metal tubes and a cast substantially nonporous rubber-like polyurethane cushion exposed to the road surface. More specifically, the invention provides a holder and cushion combination for the endless track of a tractor or the like, the holder having a closed end to lie adjacent the link of the track and opposite perforated end lying adjacent the cushion. Two opposing sides of the holder are formed from sheet metal and the other two opposing sides have a curved surface which may be formed by using a metal tube or pipe which has been split longitudinally. A perforated metal plate is placed over one end of the box-like holder and a suitable polyurethane is cast about the holder to form a relatively thick cushion which extends above the perforated plate and through the perforations against the closed end of the box-like holder. A relatively thin polyurethane layer extends from the thick cushion around the external part of the box to completely enclose the holder. A plurality of substantially parallel metal tubes or pipes extend across the inside of the box-like holder. That end of the holder adjacent the cushion has protruding edges which provide a support for a perforated plate.

Referring now to the drawing for a more detailed description of one embodiment of the invention, the holder and cushion are shown in Figure 1 attached to the link 13 of a tractor track. The cushion holder 1 is made from aluminum sheets shaped to form a box-type construction having protruding edges 2 on one end thereof. Aluminum pipes 3 are inserted in the resulting box-like structure and are arranged in a substantially parallel relationship with each other. These pipes extend in a direction parallel to the half pipes. They are welded to aluminum sheets forming the side of the box to secure the ends of the pipe 3 to the side walls of the box. Holes in the sidewall correspond to the opening in the pipe 3. The welding of the end of the pipe 3 is shown at 4, Figure 1. Pieces of pipe 5 split longitudinally, are welded to the box-like structure providing a depression in the side walls of the holder adapted to receive skid chains and a perforated aluminum plate 6 is welded to the protruding edges 2 of holder 1. A cushion 8 is cast from a substantially nonporous rubber-like polyurethane. This cushion extends through the holes 7 in perforated plate 6 into that portion 10 of the box-like holder adjacent the end of the holder. Polyurethane also extends around the entire holder to provide a thin protective cover 14. A pin with protruding ends 11 is provided at the middle of the holder as shown in Figures 2 and 3 to be used for attaching skid chains. A machine bolt 12 is inserted through each pipe 3 and through an opening in the track link to secure the holder 1 to the link 13 of the track. It is apparent from Figures 1, 2 and 3 that the resulting holder has opposing curved surfaces parallel to the pipe and opposing sheet metal surfaces at the end of the pipe. The holder has a substantially smooth top as shown in Figure 3.

As indicated hereinbefore, it is preferred that the sheet metal and the pipe used in making the box-like holder be aluminum. Such construction provides a holder having advantageous strength characteristics as well as being light in weight, thereby permitting high track velocities. Inasmuch as the perforated plate is welded to the end of the holder in such a way that a cavity is available for filling with polyurethane, the cushion is securely attached to the holder and prevents tearing of the cushion from the track. The coating of the entire holder with polyurethane may be eliminated in some embodiment but best results are obtained when the coating is provided because corrosion of the holder is prevented.

Any suitable substantially nonporous rubber-like polyurethane prepared in accordance with the processes disclosed in U.S. Patents 2,764,565; 2,729,618; 2,620,516 and 2,621,166 may be used to form the cushion. The polyurethane may be prepared by any of the heretofore disclosed processes for making a solidified substantially nonporous rubber-like polyurethane, such as, by reacting an organic compound having reactive hydrogen atoms with an organic diisocyanate and a chain extender or cross-linking agent. The organic compound having reactive hydrogen atoms may be polyester, polyalkylene ether glycol or the like and any suitable organic polyisocyanate, preferably an organic diisocyanate, such as, for example, 1,5-naphthylene diisocyanate or paraphenylene diisocyanate, may be used. Glycols or diamines are usually used as a cross-linking agent. The invention is not concerned with the chemistry of preparing the polyurethanes, however, and further description of the method of making it can be found in the aforesaid patents. The cushion can be cast about the perforated plate and remainder of the holder in a suitable mold by conventional methods. The polyurethane must have a Shore A hardness of from about 60° to about 95° and an elongation of from about 350% to about 700%.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:

1. In combination, an endless track link and a cushion contained within a holder, said holder having a bottom, a pair of opposing sides, a second pair of opposing sides having surfaces curving inwardly, a perforated plate lying over the edges of the first said sides, and a polyurethane cushion projecting from said perforated plate and through the perforations into the said holder.

2. A padded link for an endless track comprising a polyurethane cushion and a cushion holder, said holder having side walls, a top at one end and a perforated plate at the opposite end, a plurality of pipes lying in substantially parallel relationship with each other inside and across the width of the holder, each end of said pipes being secured to a side wall which has an opening therein communicating with the opening in the pipe, said pipe thereby being adapted to receive a bolt to fasten said holder to said link, said perforated plate being embedded in said cushion.

3. The padded link of claim 2 wherein said holder is made of aluminum.

4. The padded link of claim 2 wherein two of the side walls of the holder have a lower edge projecting beyond the other sidewalls and said perforated plate is welded to said edges thereby providing a cavity between the bottom of the holder and the perforated plate.

5. The padded link of claim 2 wherein the entire holder is enclosed in polyurethane plastic.

References Cited in the file of this patent

UNITED STATES PATENTS

| | | |
|---|---|---|
| 1,863,481 | Hurlimann | June 14, 1932 |
| 1,886,839 | Scheckel | Nov. 8, 1932 |
| 2,332,313 | Galanot | Oct. 19, 1943 |
| 2,844,413 | Gates et al. | July 22, 1958 |

FOREIGN PATENTS

| | | |
|---|---|---|
| 555,749 | Germany | Nov. 13, 1930 |